US012756630B2

(12) United States Patent
Tian et al.

(10) Patent No.: US 12,756,630 B2
(45) Date of Patent: Oct. 6, 2026

(54) BINDING INDICATIONS FOR NOTIFICATION RESILIENCY

(71) Applicant: HEWLETT PACKARD ENTERPRISE DEVELOPMENT LP, Spring, TX (US)

(72) Inventors: Lu Tian, Plano, TX (US); Swaminathan Venkataraman, Bangalore (IN); David C. Williamson, Plano, TX (US); Anders Askerup, Plano, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 690 days.

(21) Appl. No.: 18/309,539

(22) Filed: Apr. 28, 2023

(65) Prior Publication Data

US 2024/0364595 A1 Oct. 31, 2024

(51) Int. Cl.
*H04L 41/12* (2022.01)
*H04W 84/04* (2009.01)

(52) U.S. Cl.
CPC .......... *H04L 41/12* (2013.01); *H04W 84/042* (2013.01)

(58) Field of Classification Search
CPC ......... H04W 8/00; H04W 24/04; H04W 4/80; H04M 15/8214; H04M 15/41; H04M 15/66; H04M 15/8228; H04L 67/51; H04L 12/1407
See application file for complete search history.

(56) References Cited

U.S. PATENT DOCUMENTS

| | | | | |
|---|---|---|---|---|
| 10,904,739 | B2 | 1/2021 | Lee et al. | |
| 11,283,883 | B1 * | 3/2022 | Krishan | H04L 67/51 |
| 2015/0208291 | A1 * | 7/2015 | Lee | H04W 36/0011 370/331 |
| 2020/0322775 | A1 * | 10/2020 | Lee | H04W 8/02 |
| 2021/0067480 | A1 * | 3/2021 | Goel | H04L 61/10 |
| 2021/0067485 | A1 * | 3/2021 | Goel | H04L 61/4511 |
| 2021/0168585 | A1 * | 6/2021 | Li | H04W 8/12 |
| 2021/0258824 | A1 * | 8/2021 | John | H04W 76/10 |

FOREIGN PATENT DOCUMENTS

| | | | |
|---|---|---|---|
| WO | 2020/074092 | A1 | 4/2020 |
| WO | 2021/063657 | A1 | 4/2021 |
| WO | 2021/094236 | A1 | 5/2021 |
| WO | 2021/197074 | A1 | 10/2021 |
| WO | 2021/198207 | A1 | 10/2021 |
| WO | 2022/123526 | A1 | 6/2022 |

* cited by examiner

*Primary Examiner* — Mahran Y Abu Roumi
(74) *Attorney, Agent, or Firm* — Dickinson Wright

(57) ABSTRACT

Systems and methods are provided for identifying an alternative network function (NF) service consumer to which a notification regarding an observed event may be sent (in the event that a notification sent to an originally-intended/targeted NF service consumer fails). NF discovery request and response operations between a NF service producer and a data repository (at which a NF profile associated with the NF service consumer is registered) may be performed to identify and receive (as part of a NF discovery response operation), binding indication information. The binding information may be used to determine the aforementioned, alternative NF service consumer to receive the notification.

20 Claims, 8 Drawing Sheets

BINDING INDICATIONS FOR NOTIFICATION RESILIENCY

BACKGROUND

In non-virtualized networks, network functions (NFs) are implemented as a combination of vendor-specific software and hardware, which can be referred to as network nodes or network elements. Such NFs can be connected or chained in a certain manner to achieve a desired overall functionality or service. Non-virtualized networks may be defined by statically combining NFs in a way that can be expressed as a NF forwarding graph or NF set construct.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
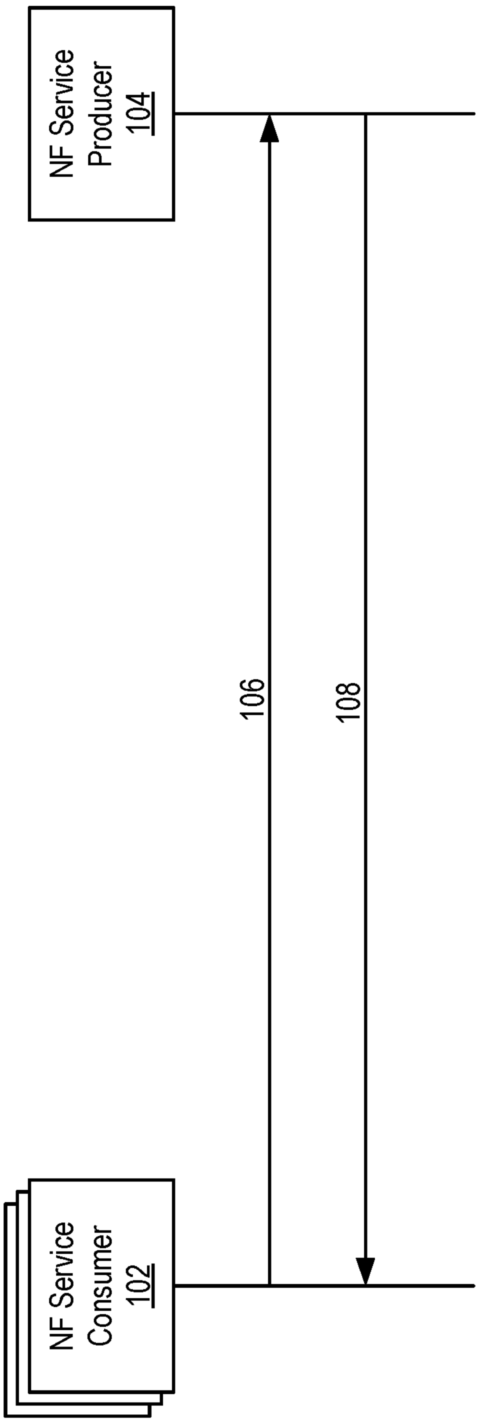
FIG. 1A is a sequence diagram illustrating an example interaction between NFs using a typical request-response mechanism.

The figures are not exhaustive and do not limit the present disclosure to the precise form disclosed.

DETAILED DESCRIPTION

Wireless devices (e.g., smart phones, tablets, and laptops) are used to send and receive data. Such data may be transmitted and received over a wireless network. The 5$^{th}$ Generation (5G) standard is a standard promulgated by the International Telecommunication Union (ITU) and the 3rd Generation Partnership Project (3GPP), with the ITU setting the minimum requirements for 5G compliance, and the 3GPP creating the corresponding specifications. 5G is a successor to the 4G/Long Term Evolution (LTE) standard, and refers to the fifth generation of wireless broadband technology for digital cellular networks. 5G is intended to replace or augment 4G/LTE.

A service-based architecture (SBA) typically refers to an architecture, e.g., a communications network architecture, that emphasizes the use of or relies on services as a primary architecture component used to effectuate certain functionality. Service-based architectures tend to be distributed in nature, where service components or resources are remotely accessed through some protocol, e.g., the Representational State Transfer (REST) protocol, and Simple Object Access Protocol (SOAP), to name a few. For example, the 3GPP defines the 5G system architecture as being an SBA, i.e., an architecture in which system functionality can be achieved by one or more network functions (NFs) providing services to other authorized NFs to access their services. Typically, an NF service can refer to some capability exposed by an NF, i.e., an NF service producer, to another authorized NF, i.e., an NF service consumer, through some service-based interface. Different NFs may offer different functionalities, and thus, different NF services.

Binding can refer to a concept of associating particular NF entities or instances to one another, to some particular NF service, etc. For example, binding can be used to indicate a suitable, target NF producer instance(s) for NF service instance selection, reselection and routing of subsequent requests associated with a specific NF producer resource (context) and NF service. This allows the NF producer to indicate that a NF consumer, for a particular context, should be bound to a particular NF service instance, NF instance, NF service set or NF set depending on local policies and other criteria. Binding can also be used by the NF consumer to indicate suitable NF consumer instance(s) for notification target instance reselection and routing of subsequent notification requests associated with a specific notification subscription. Binding is also used for providing a Binding Indication for service(s) that an NF consumer produces for the same data context, and that the NF service producer is subsequently likely to invoke.

Per the 3GPP, an NF service consumer may subscribe to an NF service producer to be notified of the occurrence of an event, some change or updating of data relevant to/used by the NF service, etc. Typically, the NF service consumer includes a callback reference uniform resource identifier (URI) to receive the notification, i.e., a URI directed to a notification endpoint, in this case, the NF service consumer. In practice, at times, the callback reference URI may not be reachable due to, e.g., lack of response from the NF service consumer. For notification resiliency, the 3GPP specifies a binding indication which contains the binding level, NF set ID and notify service name, etc. (described in greater detail below). Based on the binding indication, the NF service producer selects an equivalent/alternative NF service consumer to which the notification may be sent.

Currently, the NF service consumer includes the aforementioned binding indication in its subscription request to the NF service producer. However, in the event that the binding indication changes prior to the notification being sent, the NF service producer is still operating based on a previous, outdated or non-current binding indication. That is, the NF service producer is unable to receive or otherwise obtain the newest or latest binding indication in time to effectuate a successful notification transmission to a proper NF service consumer. In some scenarios, a NF service consumer may have already subscribed to a NF service producer before a binding indication is enabled. The result is the same, i.e., the NF service producer does not have a current/up-to-date binding indication on which transmission of a notification to an alternative NF service consumer can be based. Thus, notification resiliency, as currently implemented may fail in certain circumstances.

Therefore, and in accordance with examples of the disclosed technology, an NF service consumer may register or specify a binding indication within or as part of the NF profile of the NF service consumer in the Network Repository Function (NRF), which may be, e.g., a type of data repository. In a system, such as a 5GC, the NRF provides for NF service registration, authorization, and discovery, and otherwise enables NFs to identity one another. When an NF service producer sends a notification (e.g., in response to an event or data change, and in accordance with a subscription request), the latest binding indication will be available from the NRF. Thus, if/when transmission of a notification from a NF service producer to a NF service consumer (based on the callback reference URI presented in the subscription request) fails, that NF service producer has the ability to query the NRF (through NF discovery or NF status notification) for the NF service consumer's NF profile identified by the NF instance ID provided in the subscription request. The NF service producer can be made aware of the latest binding indication, and may then query the NRF again for NF profiles equivalent to/matching the original NF service consumer NF. The NF service producer then can re-transmit the notification (i.e., a subsequent notification can be transmitted) to the appropriate notification endpoint, in this case, an alternative NF service consumer selected from the discovered NF profile. In other words, if the callback reference URI received in the subscription request is not reachable, the NF service producer can, based on the latest binding indication, select an alternative NF service consumer to which the notification may be transmitted.

It should be noted that pursuant to SBA, NFs may communicate with one another. Interactions between NFs are embodied as request-response and subscribe-notify interactions between the NF service consumer and NF service producer (and sometimes via a Service Community Proxy (SCP).

FIG. 1A illustrates an example request-response interaction between an NF service consumer, e.g., NF service consumer 102, and an NF service producer, e.g., NF service producer 104. In this example, NF service consumer 102 may request NF service producer 104 to provide a particular NF service. The NF service may perform some operation or action, the NF service may provide information or data, or the NF service may do both—perform some operation as well as provide data. A request-response mechanism can be used to facilitate NF service producer 104 providing the requested NF service to NF service consumer 102. For example, NF service consumer 102 may transmit, to NF service producer 104, a service request 106 to provide the desired NF service. A response to NF service consumer 102's request is typically expected within a given/specified timeframe. Accordingly, NF service producer 104 may transmit a response 108 back to NF service consumer 102. NF service producer may, in some cases, add a binding indication to response 108, which may be used by NF service consumer 102 to select an appropriate NF service producer instance(s) for any subsequent requests. Similarly, as noted above, NF service consumer 102 may add a binding indication to its service request 106 with implicit subscriptions so that NF service producer 104 is aware of an appropriate (alternative) NF service consumer to which a notification (or requested information, for example) can be sent.

Figure 1B:
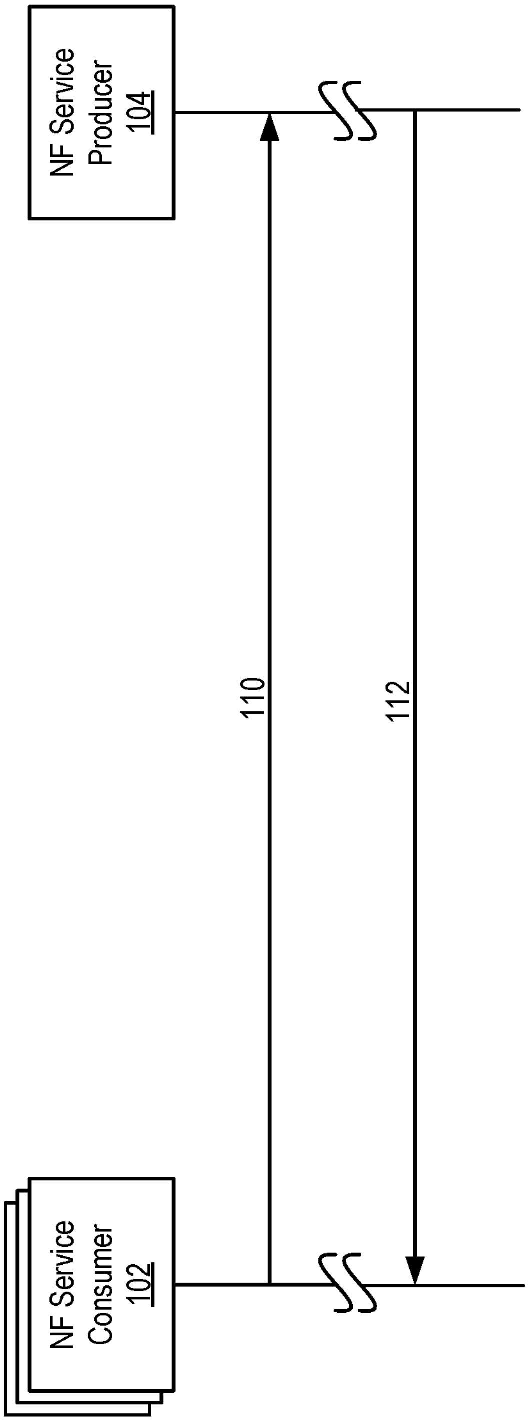
FIG. 1B is a sequence diagram illustrating an example interaction between NFs using a typical subscribe-notify mechanism.

FIG. 1B illustrates an example subscribe-notify interaction between an NF service consumer, e.g., NF service consumer 102, and an NF service producer, e.g., NF service producer 104. In this example, NF service consumer 102 subscribes to be notified of, e.g., an event (or data change) observed by NF service producer 104, and NF service producer 104 can notify NF service consumer 102 of any changes to, or events occurring regarding the NF service. Here, NF service consumer 102 may transmit a subscribe/subscription request 110 to NF service producer 104, e.g., a Unified Data Manager (UDM) Event Exposure (EE) subscription and a UDM Subscription Data Management (SDM) subscription. A typical subscription request may include a notification endpoint, i.e., a Notification Target Address, and a Notification Correlation ID, which can be, e.g., a notification Uniform Resource Location (URL) of NF service consumer 102 (which in some scenarios, can include a binding indication) to which an event or data change notification should be sent vis-à-vis the notification 112. In addition, the subscription request 110 may include a notification request for periodic updates or a notification triggered through certain events (e.g. the information requested gets changed, reaches certain threshold etc.). The subscription for notification can be done through, e.g., an explicit subscription (a "separate" request-response/subscribe-notify interaction of exchange between NF service consumer 102 and NF service producer 104: The subscription can also be accomplished with an implicit subscription (where the notification subscription is part of some other NF service operation of the same NF service, for example. Moreover, a notification endpoint can be registered or specified for each type of notification NF service consumer 102 may wish to receive, for example, a deregCallbackURI in Amf3GppAccessRegistration (which can refer to a URI provided by the AMF (described below) to receive implicitly subscribed notifications on deregistration of a UE.

It should be understood that both NF service consumers and NF service producers may themselves, be NFs. An NF service is one type of capability exposed by an NF (e.g., an NF service producer) to another, authorized NF (e.g., an NF service consumer) through a service-based interface. NF services are typically derived from system procedures that describe an end-to-end functionality, where applicable. Services may also be defined based on information flows from other 3GPP specifications. System procedures can be described by a sequence of NF service invocations. NF services may communicate directly between NF service consumers and NF service producers, or indirectly via an SCP.

Figure 2:
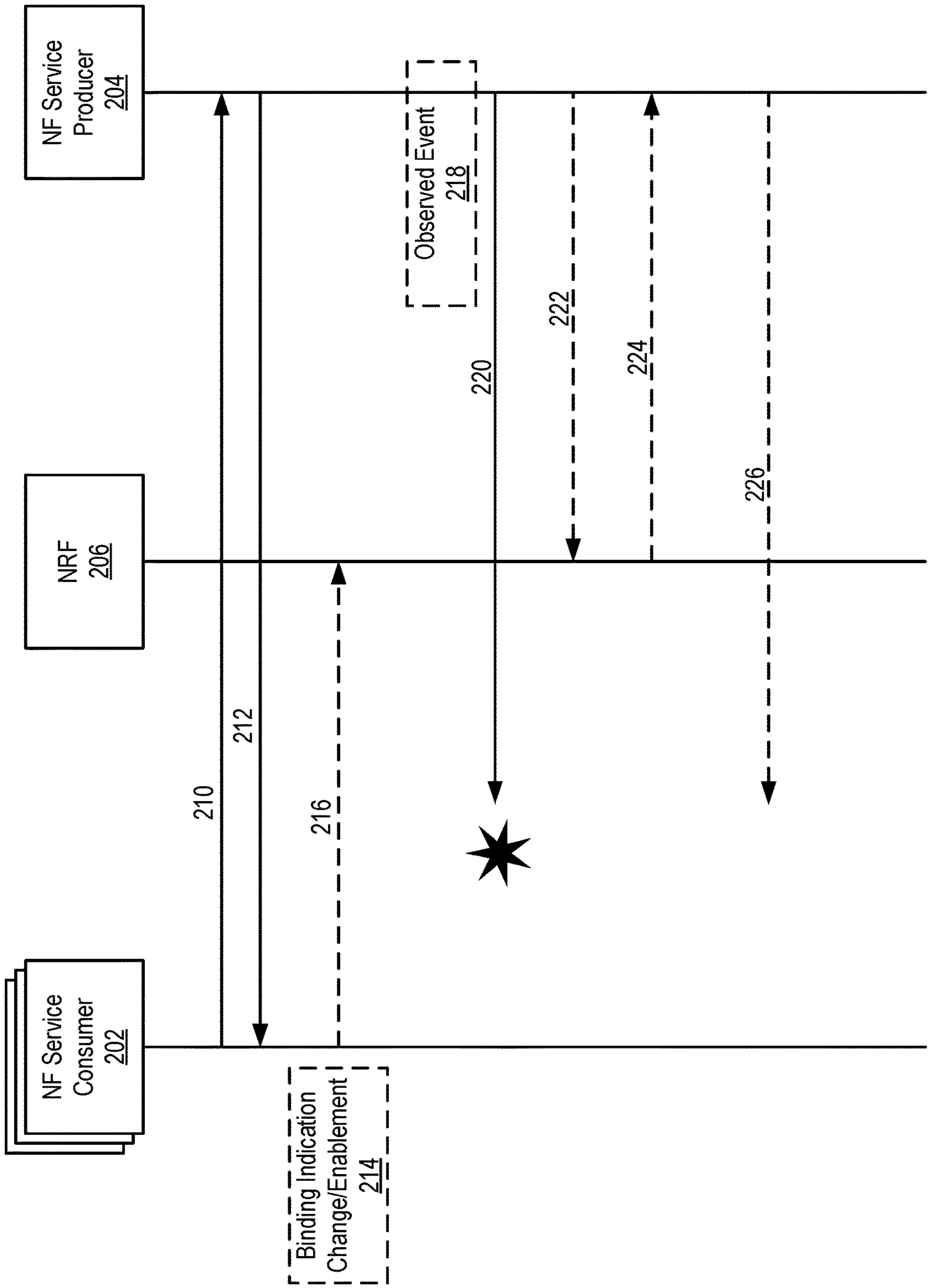
FIG. 2 is a sequence diagram illustrating an example interaction between NFs in which an outdated binding indication creates notification resiliency issues.

FIG. 2 illustrates an example scenario in which notification resiliency fails due to an NF service producer not having the latest binding indication/the latest binding indication not taking effect immediately to support notification. As illustrated in FIG. 2, NF service consumer 202, may send a subscription request 210 to NF service producer 204. The subscription request may include, at least in part, a 3gpp-Sbi-Binding header that is typically used to signal binding information relating an NF service resource to a consumer of that resource. This 3gpp-Sbi-Binding header may contain or include a comma-delimited list of binding parameters. As noted above, a binding indication can reflect or indicate suitable NF information for notification target instance reselection and routing of subsequent notification requests associated with a specific notification subscription. The 3gpp-Sbi-Binding header may further include NF set ID information. The NF set ID can refer to a globally unique identifier of a set of equivalent and interchangeable NFs from a given network that provide distribution, redundancy, and scalability. Further still, the 3gpp-Sbi-Binding header can comprise a notify service name, which refers to an information element that indicates the name of a defined service/custom service that handles a notification or callback request when present in a binding indication for a subscription or callback. The subscription request message 210 may also include an NF Instance ID as well as a callback Resource URI. The NF Instance ID reflects the identifier of an NF instance to which the aforementioned binding indication applies, while the callback Resource URI specifies the address to which (in this example) NF service producer 204 should send a notification. It should be understood that notifications can be considered a type of callback, hence specification of the NF service consumer URI to which notifications should be transmitted. NF service producer 204, in response to subscription request 210, sends a subscription response 212 acknowledging subscription request 210 upon NF service producer 204 storing the requested subscription.

Continuing with the description of FIG. 2, as noted above, the binding indication(s) initially or originally set forth in a subscription request, e.g., subscription request 210 sent by NF service consumer 202 to NF service producer 204, can change. That is, an equivalent or alternative NF service consumer may be identified after NF service consumer 202 completes its subscription to NF service producer 204. In some scenarios, binding may not have been enabled, but is subsequently enabled following the subscription operation between NF service consumer 202 and NF service producer 204. Upon a binding indication change 214, NF service consumer 202 will typically send an NF profile registration message 216 to NRF 206. In this example, the NF profile registration message 218 may include, at least an NF instance ID and an NF set ID (both described above). NF profile registration message 218 may further include notification service information, i.e., each type of notification service NF service consumer 202 intends to consume.

Regardless of whether a binding indication has changed, or binding has been subsequently enabled, because such changes/enablement occurs later than the subscription operation described above, NF service producer 204 does not have the latest/most up-to-date binding information. Again, and as illustrated in FIG. 2, NF service consumer 202 registers its NF profile with NRF 206. Thus, NF service producer 204 is unaware of such binding indication changes/enablement 214, i.e., NF service producer 204 is not updated with a new 3gpp-Sbi-Binding message for any existing subscriptions associated with NF service consumer 202. Thus, when NF service producer 204 observes some event 218, in response to which NF service producer 204 is supposed to transmit a notification 220, the NF service consumer 202 to which notification 220 is to be sent per the initial/original binding indication received in subscription request 210 is no longer valid, i.e., the target endpoint is not reachable. This is because the callback Reference URI signaled in subscription request 210 is no longer a valid URI once the binding indication changed, for example. It should be noted that notification in this example is accomplished via the HTTP/REST method, POST, which reports notifications for a monitoring subscription.

Accordingly, in an attempt to transmit the notification to an alternative NF service consumer, NF service producer 204 performs NF discovery, by sending an NF discovery message 222 to NRF 206. NF service producer 204 performs NF discovery by querying NRF 206 with the NF Set ID and notify service name information that NF service producer 204 received in the binding indication in the subscription request message 210 from NF service consumer 202. It should be understood that NF service producer 204 needs to discover the set of NF profiles that are equivalent to/match the original NF service consumer for the notify service. In response to NF discovery message 222, NRF 206 responds with an NF discovery response message 224, which includes any/all equivalent NF profiles associated with the notify service name specified in NF discovery message 222. Accordingly, NF service producer 204 may transmit one or more subsequent notification messages, such as notification message 226. Without the (latest) binding indication, NF service consumer cannot (correctly) select an equivalent/alternative notification endpoint to which the notification should be sent.

As alluded to above, to counter the problem(s) with notification resiliency based on typical implementation of binding, examples of the disclosed technology add relevant binding indications to the NF profile of NF service consumers registered in the NRF. As also alluded to above, the binding indications are associated with NF set ID and notify service names in the context of NF service subscriptions. Once binding indications are included in NF profiles of NF service consumers, binding indications will be available during NF discovery (or in an NRF status notification) so that an NF service producer is able to select an alternative endpoint for NF service consumer notification from the set of equivalent NF profiles. It should be understood that examples of the disclosed technology apply in the context of both explicit (where NF service producer and consumer engage in a separate request/response exchange), and implicit (where a subscription for notification is included as part of another NF service operation/action associated with the same NF service).

Figure 3:
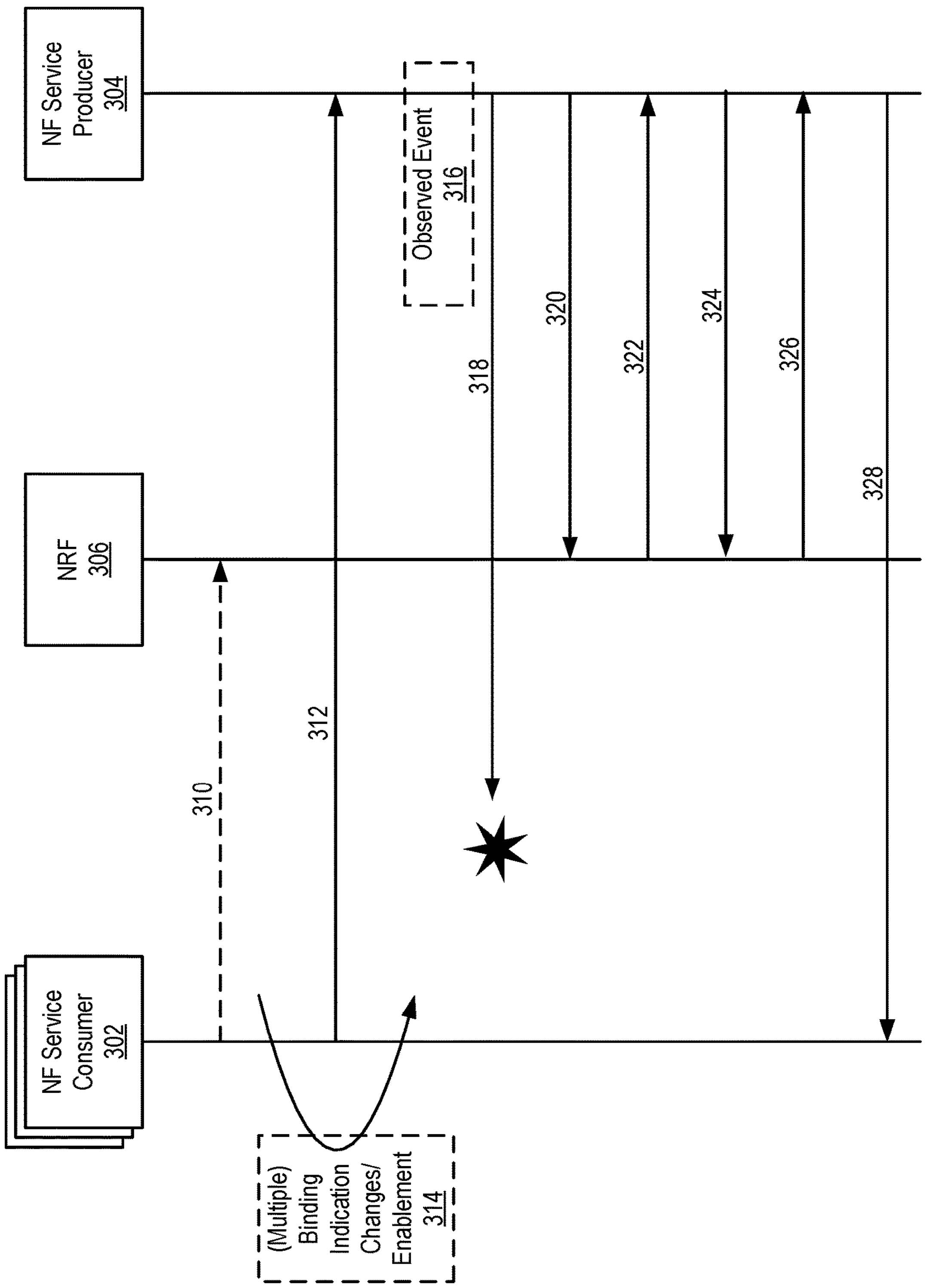
FIG. 3 is a sequence diagram illustrating an example interaction between NFs in which a binding indication is maintained in an NF consumer's NF profile to avoid notification resiliency issues in accordance with some examples of the disclosed technology.

FIG. 3 illustrates an example scenario in which binding indications can be included in NF profiles in accordance with examples of the disclosed technology. As illustrated in FIG. 3, an NF service consumer 302 may register its NF profile with NRF 306 by transmitting an NF profile registration message 310. NF profile registration message 310 may comprise information regarding an NF Instance ID and an NF set ID, along with notification service profile information with a custom service name. As discussed above, NF set ID can refer to a globally unique identifier of a set of equivalent and interchangeable NFs from a given network that provide distribution, redundancy, and scalability. The NF Instance ID reflects the identifier of the NF service consumer 302 instance. In addition, NF profile registration message 310 includes binding indications information (described above). It should be understood that in this example, multiple binding indications are associated with notifications (callbacks), and any may be enabled or changed at any time.

Similar to the example scenario illustrated in FIG. 2 (and discussed above), NF service consumer 302 may send a subscription request to NF service producer 304 regarding a particular service. In this example, NF service consumer 302 wishes to subscribe to/establish a subscription to be notified of, an event or data change, observed by NF service producer 304, and NF service producer 304 can notify NF service consumer 302 of any changes to, or events occurring regarding the NF service. Included in the (explicit/implicit) subscription request message—NF service consumer 302 registers its NF profile (including binding indication information) with NRF 306, including the multiple, aforementioned binding indications. Again as illustrated at 314, multiple binding indications can change or can be enabled.

Upon observing some event 316 (that warrants some notification), NF service producer 304 transmits a notification in accordance with the callback Reference URI (recalling that the subscription request message 312 includes NF Instance ID information associated with callback Reference URI information).

As noted above, the binding indications initially or originally set forth in an NF profile registration, e.g., NF profile registration message 310 sent by NF service consumer 302 to NF service producer 304, can change, or binding (if not previously enabled), can be enabled. As illustrated in FIG. 3, such change(s) or enablement can occur before or after a subscription request from NF service consumer 302. That is, an equivalent or alternative NF service consumer may be identified (or binding is enabled) after NF service consumer 302 completes its subscription to NF service producer 304. Again, NF service producer 304 does not have the latest/most up-to-date binding information. Thus, when NF service producer 304 observes some event 316, in response to which NF service producer 304 is supposed to transmit a notification 318, the NF service consumer 302 to which notification 318 is to be sent per the initial/original binding indication received in subscription request 312 is no longer valid, i.e., the target endpoint is not reachable. NF service producer 304 may perform a discovery operation to query NRF 306 to retrieve the NF profile the NF service consumer identified by the NF Instance Id that was received in the subscription request message 312. In this example, NF service producer 304 transmits an NF discovery request message 320 to NRF 306, which includes NF Instance ID information. As can be appreciated, NF Instance ID information was provided in NF profile registration message 310 and is associated with the binding indications set forth in the same MF profile registration message 310.

Because the NF Instance ID information is associated with NF Set ID information and the binding indications information set forth in the NF profile registration, NRF 306 can return such information to NF service producer 304. In this way, NF service producer can be made aware of the latest/most up-to-date binding indications. Recalling that NF service consumer 302 registered its NF profile with NRF 306, any changes to the binding indications information can be discovered by NF service producer 304 from NRF 306, and will be up-to-date because any binding indication changes (or binding service enablement) will be reflected in NF service consumer 302's registered NF profile.

As noted above, NF profile registration message 310 may comprise an NF profile that includes multiple binding indications. Accordingly, upon determining/obtaining the requisite binding indications associated with the NF Instance ID sent in NF discovery request message 320, NF service producer 304 may determine the appropriate binding indication associated with the notification corresponding to the observed event 316. Based on the appropriate binding indication, NF service producer 304 may transmit a subsequent NF discovery request message 324, which can include NF Set ID and notify service name information (recalling that NF Set ID and the notify service name information, in part, makes up the binding indications information received in NF discovery response message 322). Again, NF Set ID can refer to a globally unique identifier of a set of equivalent and interchangeable NFs from a given network that provide distribution, redundancy, and scalability, and notification service information can refer to the type of notification service NF service consumer 302 intends to consume. In response, NRF 306 may transmit its subsequent NF discovery response message 326, which can include information regarding equivalent NF profiles information which includes NF Set ID information, and notification service information. Ultimately, it should be understood that the binding indications information can provide notify service name information to an NF service producer, which the NF service producer can use it to subsequently query the NRF, in order for the NRF to return the requisite notification service information and NF profile information from which a new/alternative target endpoint to be notified, e.g., NF service consumer, can be determined If still other/additional binding indications and corresponding notifications exist, NF service producer 304 and NRF 306 may continue to engage in subsequent request-response interactions to determine and effectuate requisite notifications. Accordingly, NF service producer 304 may, based on the latest binding indication information, send a notification(s) 328 to the proper target endpoint(s), e.g., another NF service consumer(s).

A mobile network can be thought of as comprising two component networks, the radio access network (RAN) and the core network. In 5G cellular networking systems, these components are a 5G access network (5G-AN) and a 5G core network (5GC). In 4G/LTE cellular networking systems, these components are a radio access network (RAN) and an Evolved Packet Core Network (EPC). The 5GC may include various virtualized network functions (NFs), including, for example, a Core Access and Mobility Management Function (AMF) and a Session Management Function (SMF), both in communication with a UDM. The AMF is configured to handle connection and mobility management tasks. The SMF is responsible for collecting information related to packet data unit (PDU) session management from various network components, while controlling/orchestrating those network components based on requests from the AMF. The UDM is configured to manage user authentication, authorization, and device registration on the 5GC. The EPC may include its own NFs, including, for example, a Mobility Management Entity (MME) in communication with a Home Subscriber Server (HSS). The MME ("reconfigured" in the 5G standard into the AMF/SMF) provides connection management functionality between UEs and the EPC. NFs may be implemented as one or more network devices or apparatuses.

Figure 4:
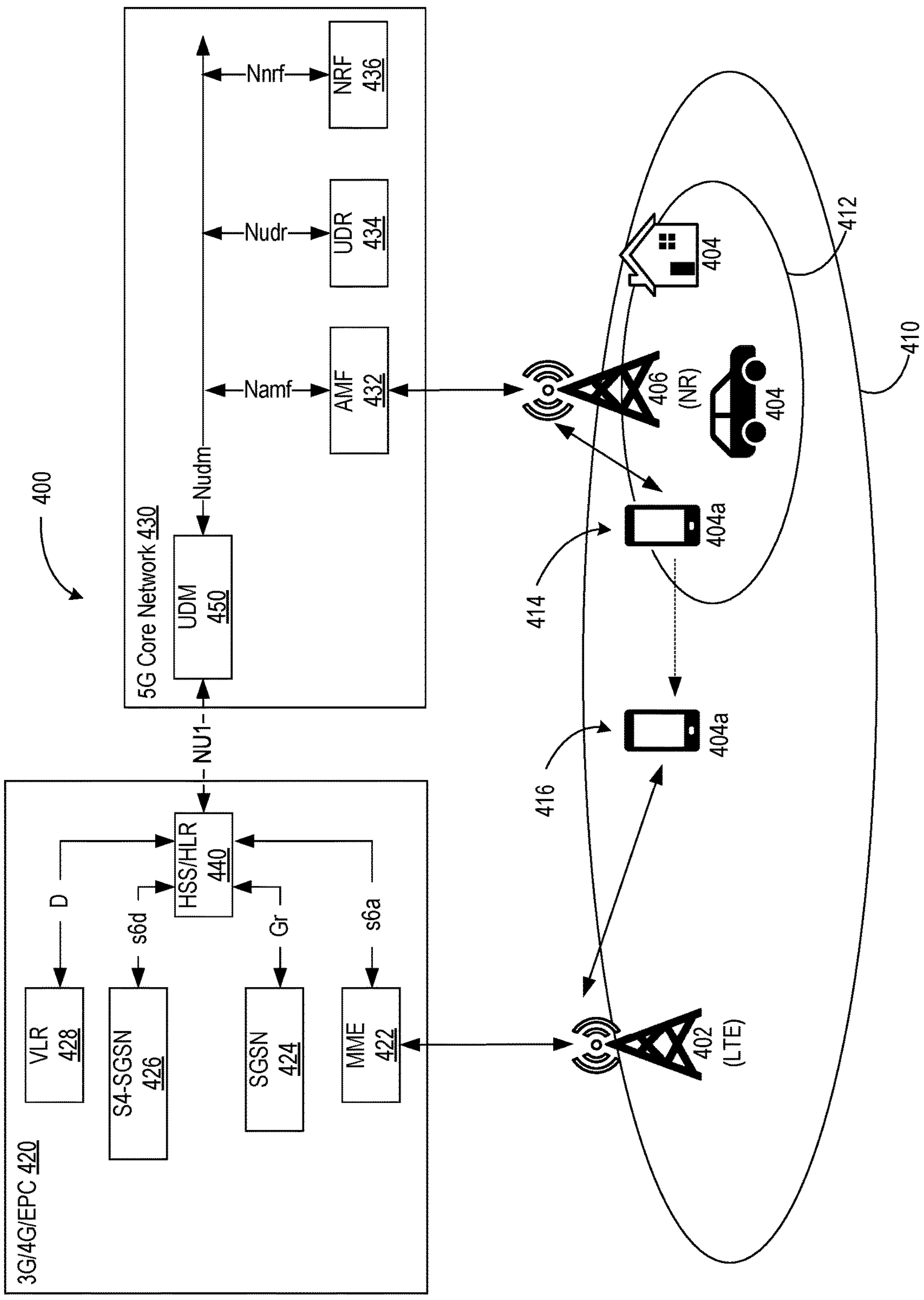
FIG. 4 illustrates an example communications network in which notification resiliency can be upheld by maintaining a binding indication in the NF profile of an NF consumer.

FIG. 4 illustrates an example cellular communication system 400 with which various implementations of the present disclosure may be implemented. The cellular communications system may comprise a plurality of base stations or cells (e.g., base stations 402 and 406), user equipment (UE) 404, an Evolved Packet Core (EPC) 420, and another core network 430 (e.g., a 5GC) operating on different types of telecommunications networks. The base stations 402 may include macrocells (high power cellular base station) and/or small cells (low power cellular base station).

In the illustrative example of FIG. 4, base station 402 is configured according to 4G/LTE standards and interfaces with the EPC 420 through an S1 interface. Base station 406 is configured according to 5G standards and interfaces with core network 430 through an N1/N2 interface. The base stations 402 and 406 may wirelessly communicate with one or more UEs 404. Each of the base stations 402 and 406 may provide communication coverage for a respective geographic coverage area 410 and 412, respectively. There may be overlapping geographic coverage areas. For example, the base station 402 may have a coverage area 410 that overlaps the coverage area 412 of one or more other base stations, such as base station 406 as shown.

While a single base station 402 (e.g., a 4G/LTE configured base station) and a single base station 406 (e.g., a 5G configured base station) are illustrated, the cellular communication systems disclosed herein are not limited thereto.

One or more base stations 402 and/or one or more base stations 406 may be provided. For example, a plurality of base stations 402 may be provided, each having a respective coverage area 410. One or more of the respective coverage areas 410 may overlap. Similarly, a plurality of base stations 406 may be provided, each having a respective coverage area 412. One or more of the respective coverage areas 412 may overlap. Furthermore, one or more coverage areas 410 may overlap with one or more coverage areas 412.

Base stations 402 and 406 may include an eNB, gNodeB (gNB), or another type of base station. Some base stations, such as base station 406, may operate in the frequency spectrum of 5G, including the low-band spectrum, i.e., the sub-1 GHz spectrum; the mid-band spectrum, i.e., the sub-6 GHz spectrum; and/or the high-band spectrum, e.g., millimeter wave (mmWave) that operates between 25 GHz and 100 GHz EPC 420 includes various network function entities, including, for example but not limited to, one or more Mobility Management Entity (MME) or Mobility Management Device (MMD) 422 (used interchangeably), a Serving Gateway (S-GW) (not shown), a Packet Data Network (PDN) Gateway, also referred to as PGW (not shown here), among other network function entities. Although MME or MMD 422 is illustrated in FIG. 4, this device may correspond with any type of mobility management device, including a Serving General Packet Radio Service (GPRS) Support Node (SGSN), a S4-SGSN, and a Visitor Location Register in various examples, and these terms are used interchangeably throughout the disclosure.

Each MME 422 may be in communication with a Home Subscriber Server (HSS) 440 over a designated interface, for example, a S6a interface used for exchange of authentication, location, and server information about subscribers between the HSS 440 and MME 422. Each MME 422 may function as a control node that processes signaling between the UEs 404 and the EPC 420, including providing bearer and connection management functionality. The Packet Data Network (PDN) Gateway may be connected to IP Services, such as the Internet, an intranet, an IP Multimedia Subsystem (IMS), a Packet-Switched (PS) Streaming Service, and/or other IP services.

The NFs of EPC 420 may be implemented as computing systems, such as one or more servers. The NFs of the EPC 420 may communicate using protocols, such as the Diameter Protocol and/or Mobile Application Part (MAP) of the SS7 protocol. For example, the Diameter Protocol may be used for messages between the MME and the HSS or an S4-SGSN and the HSS, while MAP may be used for messages between a Home Location Repository (HLR) and a SGSN or VLR. Data included in the messages on the EPC may be formatted according to American Standard Code for Information Interchange (ASCII) protocols.

Core network 430 may include various virtualized network functions (NFs), including, for example but not limited to, an Authentication Server Function (AUSF) (not shown), Core Access and Mobility Management Function (AMF) 432, a policy control function (PCF) (not shown), a session management function (SMF) (not shown in FIG. 4), a Unified Data Repository (UDR) 434, and a Network Repository Function (NRF) 436, to name a few. For example, AMF 432 may be the control node that processes the signaling between UEs 404, via base station 406 and core network 430.

AMF 432 may receive connection and mobility management tasks from UEs 404 and can handle connection and mobility management tasks, while forwarding session management tasks/messages to the SMF. AMF 432 may be in communication with UDM 450 over a service-based interface (SBI) for UDM 450, such as a Nudm interface.

Core network 430 may also include NRF 436, which provides for network function service registration, authorization, and discovery, and otherwise enables network functions to identity one another. Core network 430 may also include a User Plane Function (UPF) (not shown) that is connected to IP Services, which may include the Internet, an intranet, an IMS, a PS Streaming Service, and/or other IP services.

The NFs of core network 430 may be implemented as computing systems, such as one or more servers. The NFs of core network 430 may communicate using protocols, such as HyperText Transfer Protocol (HTTP). Communications and operations may be sent, for example, using HTTP methods, such as POST, PATCH, GET, PUT, etc.

As noted herein, AMF 432 may receive connection and session-related information from UEs across N1/N2 reference point interfaces (between UE and AMF/between RAN and AMF), but may handle connection and mobility management tasks. That is, an AMF instance may be specified by a UE, e.g., UE 404, in a Non-Access Stratum (NAS) message that is routed to the AMF instance by the RAN. Performing the role of an access point to the 5G core network (terminating the RAN control plane and UE traffic), the AMF instance may authenticate the UE and manage, e.g., handovers, for the UE between access points, base stations, and gNBs.

UDM 450 provides services to other functions of the Service-Based Architecture (SBA), such as AMF 432 and other network functions. UDM 450 may store information in local memory. UDM 450 may also store information externally, for example, within UDR 434. UDM 450 may provide authentication credentials while being employed by AMF 432 to retrieve subscriber data and access registration context data.

Although the preceding description may provide examples based on 5GC and 4G/LTE, it should be appreciated that the concepts described therein may be applicable to other types of telecommunication networks. For example, the concepts described herein may be applicable to legacy networks, such as, GPRS, CDMA, GSM, and/or other wireless technologies in which a UE may operate. For example, EPC 420 may include network functions of the legacy types of telecommunication networks. GPRS core networks included a SGSN configured to perform functions similar to MME 422. EPC 420 may include or be communicably coupled to a SGSN 424 that communicates with the HSS 440 via a designated interface, such as, a Gr interface for routing information between the SGSN 424 and the HSS/HLR 440. In some GPRS core networks, an S4-SGSN is used for performing functions similar to MME 422. EPC 420 may include or be communicably coupled to a S4-SGSN 426 that communicates with HSS 440 via a designated interface, such as, a s6d interface used for exchange of authentication, location, and server information about subscribers between HSS 440 and S4-SGSN 426. GSM core networks include a Visitor Location Register (VLR) configured to perform functions similar to the MME 422 and a HLR performing functions similar to HSS 440. EPC 420 may include or be communicably coupled to VLR 428 that communicates with HSS 440 via a designated interface, such as a D interface used for routing information between a VLR 428 and the HSS/HLR 440.

The term "mobility management entity" (MME) or "mobility management device" (MMD) can be used herein to refer to one or more of an MME, SGSN, S4-SGSN, VLR, or similar network function entity included in the EPC, while "legacy mobility management device" will be used herein to refer to one or more of SGSN, S4-SGSN, VLR and the like. Additionally, "location and service information interface" may be used to refer to one or more of the s6a, s6d, D, Gr, or similar interfaces between the HSS and a respective mobility management device.

Base stations 402 and/or 406 may provide an access point (AP) to EPC 420 or core network 430 for UE 404. Examples of UEs 404 include cellular phones, smart phones, laptop computers, tablet computers, personal computers, vehicle-implemented communication devices (e.g., vehicles having vehicle-to-vehicle (V2V) capabilities), multimedia devices, game consoles, wearable devices, or any other similar functioning device. Some of UEs 404 may be referred to as IoT devices (e.g., parking meter, gas pump, toaster, vehicles, heart monitor, etc.). Each UE may move about the cellular network system 400 into and out of respective coverages areas (e.g., coverage area 410 and 412).

As noted herein, 5G provides for interworking with the existing EPC providing for mobility of UEs between 5G and 4G/LTE, for example, or other types of telecommunication networks. Accordingly, 5G provides for service migration by attaching to and from each network as the UE moves into and out of coverage areas. Thus, interworking between the networks allows for migration of attachment between the 5GC and EPC through communication between UDM 450 and HSS 440 via a NU1 interface.

For example, as shown in FIG. 4, UE 404*a* (illustrative depicted as a mobile smartphone) moves from first position 414, in coverage area 412, to second position 416, out of coverage area 412, as shown by the dotted arrow. If UE 404*a* is capable of receiving 5G services, while present in coverage area 412, UE 404*a* may be registered with and attached to AMF 432. Upon moving out of coverage area 412 to the 4G coverage area 410, UE 404*a* will attempt to attach to EPC 420 via a registration request to the MME 422. Once registered and attached to MME 422, UE 404*a* is able to receive 4g/LTE services via EPC 420.

An interworking functionality facilitates the transition between networks to ensure that seamless transition is achieved. For 5G and EPC interworking, there are generally two solutions: single registration solution and dual registration solution. With the single registration, the UE 404*a* is permitted to attach to one of the EPC or 5G telecommunication networks at any point in time. Accordingly, a deregistration of the other telecommunication network may be exchanged through a control interface between the telecommunication networks, for example, between HSS 440 to UDM 450 over a NU1 interface when the attachment status of UE 404*a* is updated. With dual registration, UE 404*a* may be registered to both the EPC or 5GC telecommunication networks at any point in time, and thus there is no deregistration instruction transmitted as an electronic communication or message between the HSS and the UDM.

As an illustrative example, FIG. 4 shows UE 404*a* at first position 414, at which point the UE 404*a* is registered with AMF 432 for receiving 5G services. When UE 404*a* moves to second position 416, UE 404*a* moves out of the 5G coverage area 412 and needs to attach to EPC 420 to receive 4G/LTE services, which allows UE 404*a* to move from a first type of telecommunication network to a second type of telecommunication network. To do so, UE 404*a* issues a registration request to a MMD of EPC 420 and the MMD sends an update location request (ULR) to the HSS 420, via a respective location and service information interface. For example, an Update Location Request is transmitted according to the Diameter Protocol and an Update Location is transmitted according to the MAP protocol. The term "update location request" or "ULR" will be used herein to refer to an Update Location Request sent under the Diameter protocol and/or an Update Location sent under the MAP protocol. HSS 420 checks subscriber data to confirm UE 404*a* is permitted to attach to EPC 420 and other subscription information and, if so, issues an Update Location Answer to the mobility management device. Based on the Update Location Answer, UE 404*a* is registered with and attached to the MMD for rendering of services in the 4G/LTE telecommunication network.

The ULR includes an indicator, for example, Dual-Registration-5G-Indicator bit 8 in the ULR-Flag attributed-value pair (AVP), that notifies HSS 440 as to whether or not the MMD is configured for dual registration in two types of telecommunication networks. When the MMD is not configured for dual registration, this indicator in the ULR is set to 0. Upon receipt of the ULR from the MMD, HSS 440 transmits a deregistration instruction (e.g., Nudm_UECM-_Dereg-amf) to UDM 450 which delivers the deregistration notification to the registered AMF 432 (if any). Receipt of the deregistration notification may trigger the receiving AMF 432 to deregister UE 404*a* due to mobility from core network 430 to EPC 420. An example of this exchange is illustrated in connection with FIG. 2, below. According to various implementations disclosed herein, if the MMD is configured for dual registration, upon receipt of the ULR from the MMD, the HSS 440 does not transmit the deregistration instruction since registration with both the EPC 420 and core network 430 (or other two types of telecommunication networks) is permissible.

Figure 5:
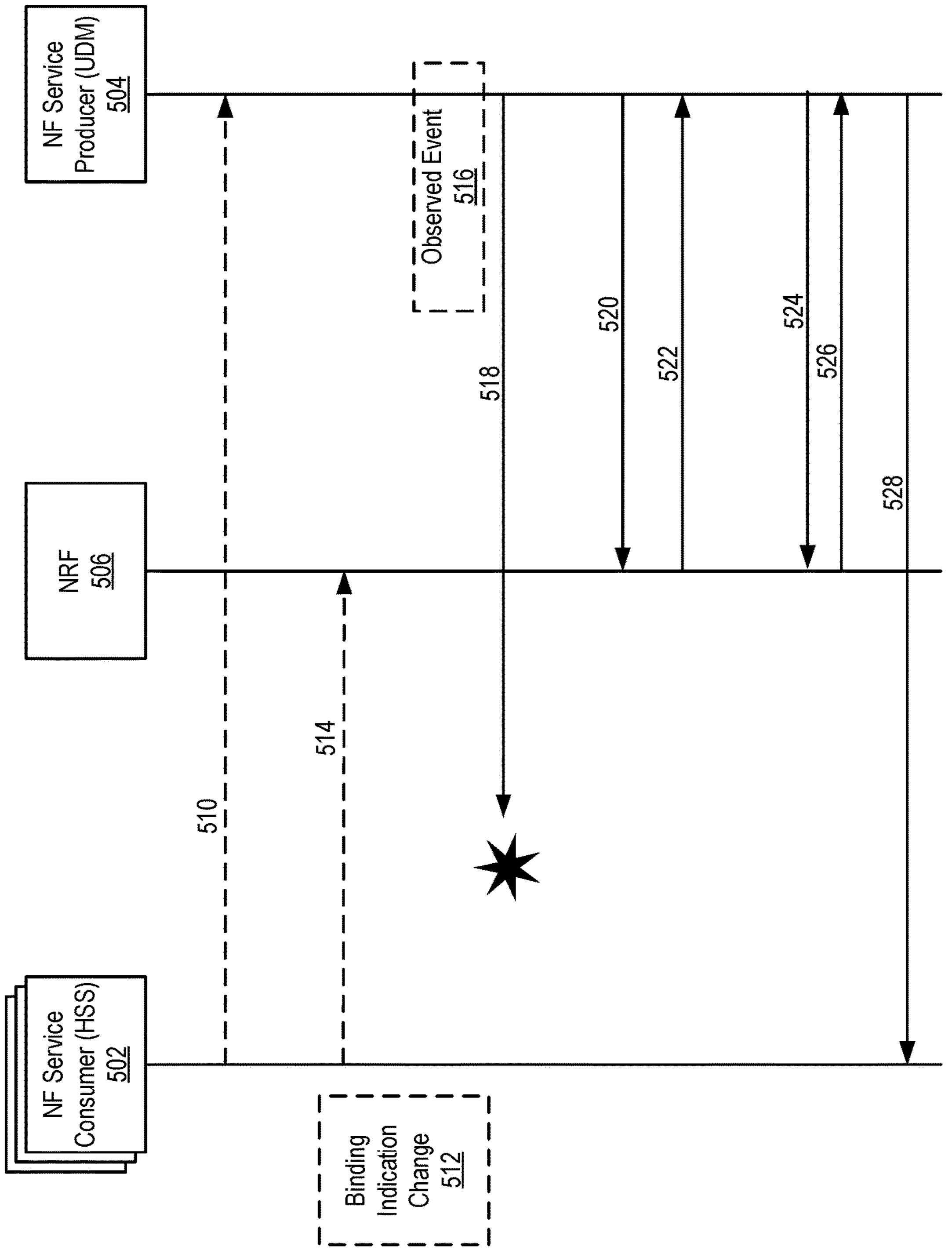
FIG. 5 is a sequence diagram illustrating an example interaction between NFs in which a binding indication is maintained in an NF consumer's NF profile to avoid notification resiliency issues in accordance with some examples of the disclosed technology.

FIG. 5 illustrates an example scenario in which a binding indication is maintained in an NF consumer's NF profile to avoid notification resiliency issues in accordance with some examples of the disclosed technology. In this example, NF service consumer 502, which may be embodied as an HSS, e.g., HSS 440 (FIG. 4), subscribes to a service(s) provided by NF service producer 504, which may be embodied as a UDM, e.g., UDM 450 (FIG. 4). It should be noted that NF service consumer 502 may also be embodied as a network exposure function (NEF), which exposes services/resources over APIs within as well as outside the 5GC. It should be noted that notification in this example is accomplished via the HTTP POST method, which reports notifications for a monitoring subscription. Thus, a POST ndum-ee/{ueIdentity}.ee-subscriptions message 510 can be sent by NF service consumer 502 to NF service producer 504. Accordingly, message 510 may include ndum-ee information which refers to a UDM event exposure service, and in this example can be used to expose the relevant API, the identity of the subscribing UE, and the subscription request itself, in this case, an ee-subscription(s). The ee-subscription information can include user-agent header information where the (source) NF type can be specified, i.e., the NF type of the NF service consumer (502). Message 510 can further include 3gpp-Sbi-NF-Peer-Info header information, which specifies the source NF Instance ID, as well as callback Resource URI information (described above), and event type information which specifies the event(s) that when observed, will trigger a notification. In this example, that eventType can signify, e.g. a "UE Reachability for SMS" event.

Similar to the example scenario illustrated in FIG. 3, NF service consumer 502 may register an NF profile with NRF 506 by transmitting a NF profile registration message to NRF 506. NF profile registration message 514 can be a PUT/PATCH nnrf-nfm NF Profile registration message, where nnrf-nfm refers to a NRF management service that allows an NF instance in some network, e.g., a public land mobile network, to register, update, or deregister its NF profile in the NRF, e.g., NRF 506. It also enables NFs, such as NF service consumer 502, to register for profile changes, for example, as well as to deregister a registered NF profile, as well as to allow for notifications of newly-registered NFs. Included in or as part of NF profile registration message 514, is NF type information, NF Instance ID information, binding indications information, notification service information, and NF Set ID information. As noted above already, binding indications can change or the binding service can be enabled at 512, which conventionally, could result in notification resiliency failures.

Upon the observance of an event 516, in this example, UE Reachability for SMS, which can refer to a UDM (which can be an embodiment of NF service producer 504) detecting a UE (identified by a ueIdentity information element in subscription message 510) can be reached for SMS communications, and notifying the HSS (which can be an embodiment of NF service consumer 502). When the UE becomes reachable for SMS communication purposes, the resulting notification message 518 to the appropriate callbackReferenceURI may fail.

Accordingly, an NF discovery request message 520 (embodied as a GET nnrf-disc request) specifying NF type, and NF Instance ID as obtained from subscription message 510, may be sent by NF service producer 504 to NRF 506. NRF 506 may send an NF discovery response message 522 that can include NF Set ID and the binding indications information relevant to/associated with the specified NF instance ID and NF type. That is, this first NF discovery response 522 contains information regarding the NF profile of the NF service consumer 502 whose NF type (found in the user-agent header) and NF Instance ID is received (e.g. in the 3gpp-Sbi-NF-Peer-Info header) in the subscription request message 510. The NF profile contains binding indications, and thus, NF service producer 504 can extract, e.g. the NF Set ID and notify service name information from the binding indication associated with the observed event 316. Once the binding indications information is known to NF service producer 504, NF service producer 504 can send another NF discovery request message 524 that includes NF type, NF Set ID, and notify service name information to NRF 506. In response, NRF 506 can transmit an NF discovery response message 526 back to NF service producer 504, which returns a set of equivalent NF profiles containingNF Set ID, and notification service information from which NF service producer 504 can determine an alternative endpoint/NF service consumer to which notification 528 can be sent. In the illustrated example, notification 528 may comprise a Notification POST message to the callbackReferenceURI with the new endpoint. That is, NF service producer 504 can select a notify service profile, and rebuild the callback reference URI with the notify service profile's endpoint to send the notification to that endpoint.

Figure 6:
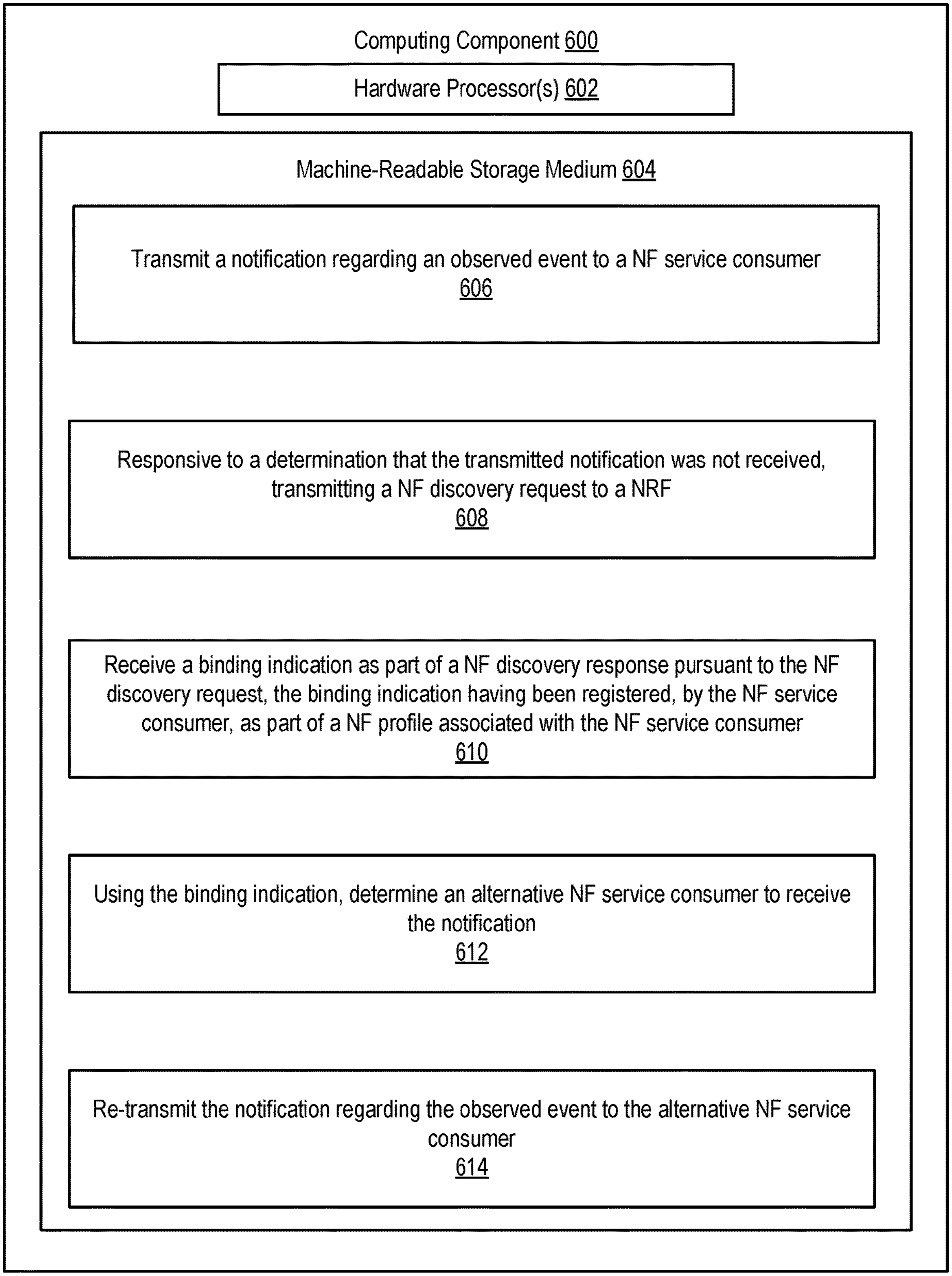
FIG. 6 is an example computing component that may be used to implement various features of notification resiliency using NF profile-stored binding indications in accordance with some examples of the disclosed technology.

FIG. 6 is an example computing component 600 that may be used to implement various features of the elements, network functions, etc. illustrated in any of FIGS. 1-5 in accordance with one embodiment of the disclosed technology. Computing component 600 may be, for example, a server computer, a controller, or any other similar computing component capable of processing data. In the example implementation of FIG. 6, the computing component 600 includes a hardware processor 602, and machine-readable storage medium 604 may embody an NF service producer, e.g., NF service producer 104, 204, 304, or 504.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-614, to control processes or operations for optimizing session continuity management. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-614.

Hardware processor 602 may execute instruction 606 to transmit a notification regarding an observed event (or data change) to a NF service consumer. It should be noted that as used herein, the term event can include an event comprising a data change, or some other occurrence, operation, result of an action/operation, etc. The NF service producer, upon observing some event that warrants notifying a subscribed NF service consumer, attempts to transmit such a notification to the NF service consumer identified by a callback Reference URI originally specified in the subscription request. This notification may fail, due to e.g. timeout or network congestion Accordingly, hardware processor 602 may execute instruction 608 to transmit a NF discovery request to a NRF in response to determining that the transmitted notification was not received. That is, the transaction may have timeout or the NF service producer may receive a network congestion response. The discovery request may take a variety of forms depending on the scenario, but ultimately is intended to query the NRF using, e.g., NF type and NF Instance ID information. NF type and NF instance ID information can be specified in the NF profile registration message and in the subscription request so that the NF instance Id information can be used to retrieve binding indication(s) information.

That is, hardware processor 602 may execute instruction 610 to receive binding indications as part of a NF discovery response pursuant to the NF discovery request. The binding indications were registered with the NRF as part of an NF profile associated with the NF service consumer, and the NF service producer queries the NRF with the NF consumer's NF type and NF instance received in the subscription request. Again, an NF Profile contains or includes, e.g., the following information: NF type; NF instance; NF Set ID; the binding indications; the notify service profile with the notify service name. For subscription-notification, the NF service consumer consumes a service (with explicit or implicit subscription) of an NF service producer which provides the notification service. Thus, the NF service consumer needs to register its NF profile with NF Set ID, the binding indications and the notify service profile (along with other services used by the NF as the NF service producer) so that the NF service producer can discover equivalent NF service consumers when sending a notification. A binding indication is associated with a certain notification callback in a subscription.

Thus, and following the above-described example, hardware processor 602 may execute instruction 612 to determine an alternative NF service consumer to receive the notification using the binding indication. That is, the NF service producer receives the NF consumer's NF profile with the binding indications from the NRF. The NF service producer extracts, e.g., an NF set ID and the notify service name from the binding indication associated with the observed event. The NF service producer queries the NRF again with NF Type, NF Set ID and the notify service name (as described above). The NRF returns a set of equivalent NF profiles identified by the NF Type and NF Set ID information. The NF service producer selects a notify service profile from the equivalent NF profiles. The NF service producer uses the endpoint specified in the notify service profile as an alternative NF service consumer to rebuild the call back reference URI for the notification. Ultimately, hardware processor 602 may execute instruction 614 to re-transmit the notification regarding the observed event to the alternative NF service consumer.

Figure 7:
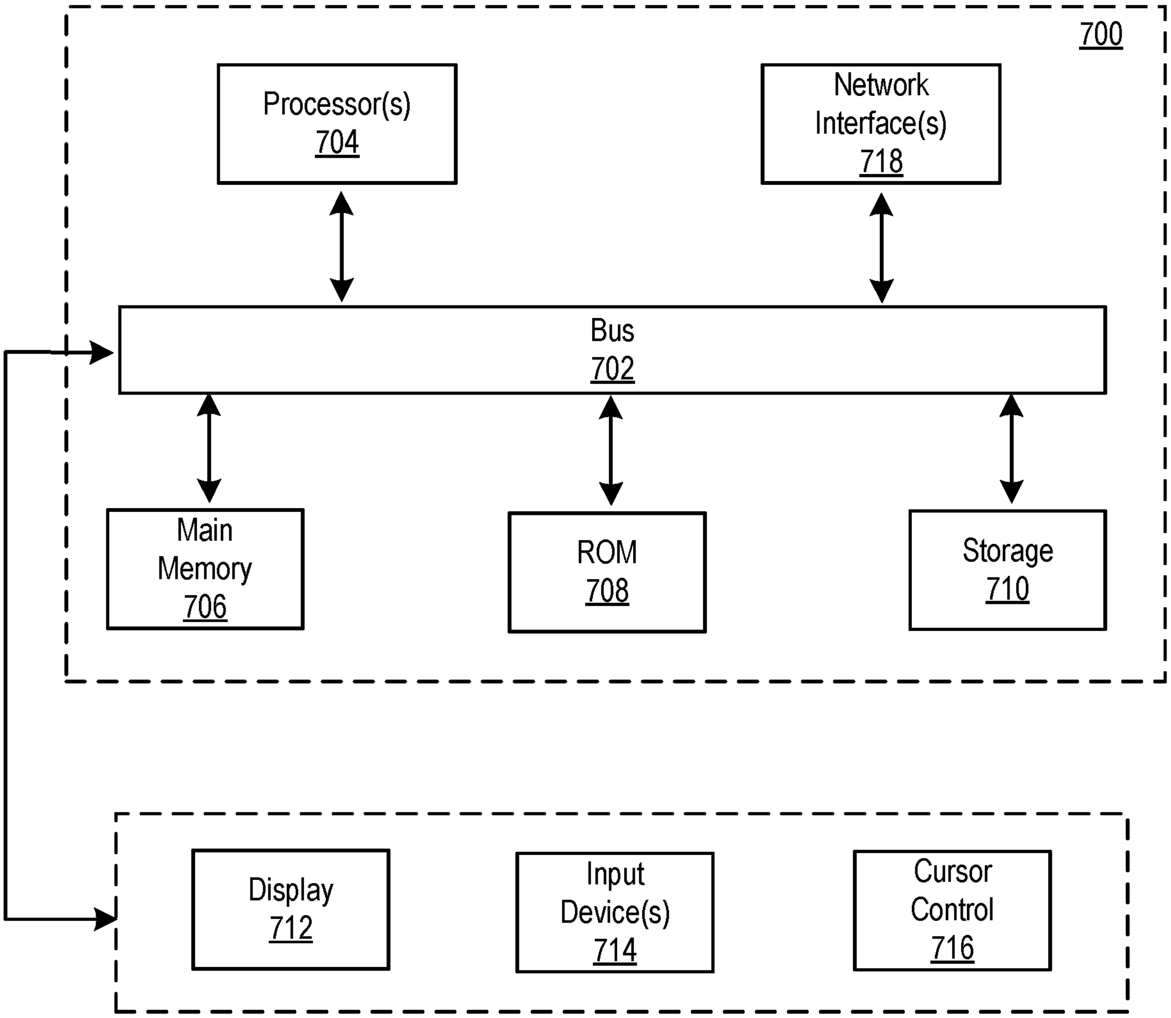
FIG. 7 is an example computing component that may be used to implement various features of examples of the disclosed technology.

FIG. 7 depicts a block diagram of an example computer system 700 in which various of the examples described herein may be implemented. For example, the functionality of one or more of the elements, NFs, etc. illustrated in any of FIGS. 1-6 may be implemented or effectuated by computer system 700. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions. Also coupled to bus 702 are a display 712 for displaying various information, data, media, etc., input device 714 for allowing a user of computer system 700 to control, manipulate, and/or interact with computer system 700. One manner of interaction may be through a cursor control 716, such as a computer mouse or similar control/navigation mechanism. Computer system 700 may further still, include a network interface(s) 818 coupled to bus 802 provides data communication to one or more network link. Network interface(s) 818 may be an integrated services digital network (ISDN) card, cable modem, satellite modem, or a modem to provide a data communication connection to a corresponding type of telephone line, LAN card, WAN component, etc.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:

transmitting, from a network function (NF) service producer, a notification regarding an observed event to a network function (NF) service consumer;

responsive to a determination that the transmitted notification was not received, transmitting a NF discovery request, from the NF service producer, to a network repository function (NRF);

receiving, by the NF service producer, from the NRF, binding indication information as part of a NF discovery response pursuant to the NF discovery request, the binding indication information having been registered as part of a NF profile associated with the NF service consumer;

using the binding indication information, determining, by the NF service producer, an alternative NF service consumer to receive the notification; and re-transmitting, from the NF service producer, the notification regarding the observed event to the alternative NF service consumer.

2. The method of claim 1, further comprising receiving a subscription request for a monitoring subscription prompting transmission of the notification.

3. The method of claim 2, wherein the monitoring subscription comprises one of an explicit monitoring subscription or an implicit monitoring subscription.

4. The method of claim 2, wherein the transmitted notification is directed to the NF service consumer in accordance with a callback reference uniform resource identifier (URI) indicated in the subscription request.

5. The method of claim 2, wherein the NF discovery request to the NRF includes NF type and NF instance ID information, the NF type and NF instance ID information having been specified in a NF profile registration message sent by the NF service consumer registering the NF profile, and received as part of the subscription request.

6. The method of claim 5, wherein the NF instance ID information is used as a reference to retrieve the binding indication information.

7. The method of claim 6, wherein using the binding information to determine the alternative NF service consumer comprises extracting NF Set ID and notify service name information from the binding indication information.

8. The method of claim 7, wherein using the binding indication information to determine the alternative NF service consumer further comprises transmitting an additional NF discovery request to the NRF, the additional NF discovery request comprising the NF type, the NF Set ID, and the notify service name information.

9. The method of claim 8, wherein using the binding indication information to determine the alternative NF service consumer further comprises receiving a set of equivalent NF profiles identified by the NF type and the NF Set ID information.

10. The method of claim 9, wherein using the binding indication information to determine the alternative NF service consumer further comprises selecting a notify service profile from the set of equivalent NF profiles.

11. The method of claim 10, wherein using the binding indication information to determine the alternative NF service consumer further comprises using an endpoint specified in the selected notify service profile as the alternative NF service consumer.

12. The method of claim 1, wherein the NF profile of the NF service consumer is registered with the NRF.

13. The method of claim 12, wherein the NF profile comprises NF instance ID, NF set ID, the binding indication information and notification service information.

14. A data repository, comprising:

a memory; and one or more processors configured to execute machine readable instructions stored in the memory to:

receive a network function (NF) profile registration message from a NF service consumer, the NF profile registration message including binding indication information;

receive a first NF discovery request with the NF service consumer's NF Instance ID from a NF service producer pursuant to a failed notification transmission regarding an event observed by the NF service producer;

transmit a first NF discovery response to the NF service producer with the NF service consumer's NF profile including the binding indication information;

receive a second NF discovery request from the NF service producer including identifying information derived from the binding indication information; and transmit a second NF discovery response to the NF service producer including a set of equivalent NF profiles identified by the identifying information allowing the NF service producer to re-transmit the failed notification transmission to an alternative NF service consumer associated with one of the set of equivalent NF profiles.

15. The data repository of claim 14, wherein the identifying information comprises NF Set ID and notify service name information.

16. The data repository of claim 15, wherein the set of equivalent NF profiles comprises a plurality of notify service profiles specifying an endpoint to which the alternative NF service consumer corresponds.

17. A network function (NF) service producer, comprising:

a memory; and one or more processors configured to execute machine readable instructions stored in the memory to:

responsive to observing an event, transmit a NF discovery request to a network repository function (NRF) upon a notification regarding the observed event failing to reach a NF service consumer;

receiving binding indication information as part of a NF discovery response transmitted by the NR, the binding indication information having been registered, by the NF service consumer, as part of a NF profile associated with the NF service consumer at the NRF;

transmit a subsequent NF discovery request to the NRF including identifying information derived from the binding indication information; and receive a subsequent NF discovery response from the NRF including a set of equivalent NF profiles identified by the identifying information; and re-transmit the failed notification to an alternative NF service consumer associated with one of the set of equivalent NF profiles.

18. The network element of claim 17, wherein the NF service consumer subscribes to the NF service producer to receive observed event notifications.

19. The network element of claim 17, wherein the identifying information comprises NF Set ID and notify service name information.

20. The network element of claim 17, wherein the set of equivalent NF profiles comprises a plurality of notify service profiles specifying an endpoint to which the alternative NF service consumer corresponds.

* * * * *